(12) United States Patent  
Oh

(10) Patent No.: US 9,127,762 B2
(45) Date of Patent: Sep. 8, 2015

(54) RESERVOIR FOR TRANSMISSION FLUID

(71) Applicant: Hyundai Motor Company, Seoul (KR)

(72) Inventor: Dong-Seok Oh, Busan (KR)

(73) Assignee: Hyundai Motor Company, Seoul (KR)

( * ) Notice: Subject to any disclaimer, the term of this patent is extended or adjusted under 35 U.S.C. 154(b) by 12 days.

(21) Appl. No.: 13/886,521

(22) Filed: May 3, 2013

(65) Prior Publication Data

US 2014/0161431 A1    Jun. 12, 2014

(30) Foreign Application Priority Data

Dec. 7, 2012 (KR) .................. 10-2012-0142145

(51) Int. Cl.
*F24H 1/20* (2006.01)
*F16H 57/04* (2010.01)

(52) U.S. Cl.
CPC ........ *F16H 57/0412* (2013.01); *F16H 57/0413* (2013.01); *F16H 57/0417* (2013.01)

(58) Field of Classification Search
None
See application file for complete search history.

(56) References Cited

U.S. PATENT DOCUMENTS

| | | | | | |
|---|---|---|---|---|---|
| 1,820,458 | A | * | 8/1931 | Jenkins | 392/484 |
| 2,266,216 | A | * | 12/1941 | Kimberlin | 392/489 |
| 3,591,079 | A | * | 7/1971 | Peters | 237/8 A |
| 3,626,148 | A | * | 12/1971 | Woytowich et al. | 219/208 |
| 4,059,520 | A | * | 11/1977 | Roller | 210/184 |
| 4,177,375 | A | * | 12/1979 | Meixner | 219/441 |
| 4,208,570 | A | * | 6/1980 | Rynard | 219/208 |
| 4,245,593 | A | * | 1/1981 | Stein | 123/142.5 R |
| 4,343,988 | A | * | 8/1982 | Roller et al. | 392/467 |
| 4,770,134 | A | * | 9/1988 | Foreman et al. | 123/142.5 R |
| 4,940,114 | A | * | 7/1990 | Albrecht | 184/6.3 |
| 5,280,158 | A | * | 1/1994 | Matava et al. | 219/492 |
| 5,352,862 | A | * | 10/1994 | Barr | 219/205 |
| 5,638,774 | A | * | 6/1997 | Albertson et al. | 123/41.33 |
| 6,196,168 | B1 | * | 3/2001 | Eckerskorn et al. | 123/41.33 |
| 6,330,910 | B1 | * | 12/2001 | Bennett | 165/297 |
| 6,441,343 | B1 | * | 8/2002 | Granborg | 219/202 |
| 6,520,136 | B2 | * | 2/2003 | Ito et al. | 123/142.5 R |
| 6,539,171 | B2 | * | 3/2003 | VonArx et al. | 392/451 |
| 7,177,536 | B2 | * | 2/2007 | Natsuhara et al. | 392/479 |
| 7,574,987 | B2 | * | 8/2009 | Preiholt | 123/142.5 E |
| 2002/0090209 | A1 | * | 7/2002 | VonArx et al. | 392/451 |
| 2006/0060346 | A1 | * | 3/2006 | Sasaki | 165/297 |
| 2007/0295475 | A1 | * | 12/2007 | Samie et al. | 165/41 |
| 2008/0138052 | A1 | * | 6/2008 | Wu | 392/465 |
| 2011/0284309 | A1 | * | 11/2011 | Gooden et al. | 180/339 |
| 2012/0055913 | A1 | * | 3/2012 | Huang et al. | 219/202 |

FOREIGN PATENT DOCUMENTS

| | | |
|---|---|---|
| JP | S 63-59258 A | 3/1988 |
| JP | 2003-074789 A | 3/2003 |
| JP | 2004-270618 A | 9/2004 |
| KR | 1997-0046439 | 7/1997 |
| KR | 2004-430310000 | 12/2008 |

* cited by examiner

*Primary Examiner* — Thor Campbell
(74) *Attorney, Agent, or Firm* — Mintz Levin Cohn Ferris Glovsky and Popeo, P.C.; Peter F. Corless

(57) ABSTRACT

In one embodiment, an Automatic Transmission Fluid (ATF) reservoir is provided. The reservoir includes housing that is combined with a transmission containing ATF and into/out of which the AFT flows. The reservoir also includes a heating body that is combined with the housing and heats the ATF flowing within the housing by generating heat when power is applied.

8 Claims, 4 Drawing Sheets

RESERVOIR FOR TRANSMISSION FLUID

CROSS-REFERENCE TO RELATED APPLICATION

This application claims priority under 35 U.S.C. §119 to Korean Patent Application No. 10-2012-0142145, filed on Dec. 7, 2012, in the Korean Intellectual Property Office, the disclosure of which is incorporated herein by reference in its entirety.

BACKGROUND (a) Technical Field

The present invention relates to a reservoir for transmission fluid, such as ATF (Automatic Transmission Fluid). More specifically, a reservoir for ATF that can rapidly heat ATF with a PTC (Positive Temperature Coefficient) thermistor upon power being applied, and keep the ATF warm to be able to be used during cold-starting.

(b) Background Art

As is well understood by those skilled in the art, automatic transmissions require the use of ATF to work properly. As such the properties of the ATF have a significant impact on the efficiency, durability and operability of the transmission.

The ATF functions as a medium that carries torque from an engine to the axle. In particular, the viscosity of the ATF decreases in an inverse proportion to increases in temperature. Therefore, when the temperature of the ATF is too high, the transmission efficiency decreases and fuel efficiency reduces, whereas when the temperature of the ATF is too low, a shock is generated during shifting. Accordingly, it is preferable to keep the temperature of the ATF within an appropriate temperature range in order to prevent loss of power, reduction of fuel efficiency, and a reduction in vibrations.

To this end, some vehicles are additionally equipped with a warmer that rapidly increases the temperature of the ATF in the early stage of starting the vehicles and/or with an oil cooler that cools overheated ATF, depending on the type of vehicle in which it is installed. Typically, an oil cooler is integrally formed with a radiator at the front of vehicles to cool the coolant.

The warmers of the related art, however, typically use heat generated from the engine as a heat source.

However, when the engine is still cold, this heating method is ineffective. Furthermore, these types of heaters do not directly heat the fluid, but instead exchanging heat with a coolant. Therefore, it takes a time to increase the temperature of a coolant which is cold, so a new device that can more quickly heat ATF is required.

Further, since the oil cooler for cooling ATF and a warmer are individually connected, the spatial efficiency of an engine room is decreased.

SUMMARY OF THE DISCLOSURE

Therefore, the present invention has been made in an effort to satisfy the necessities and solve the problems of the related art and an object of the present invention is to provide a reservoir of ATF which is mounted on a transmission that occupies a small amount of space, makes it easy to connect parts thereto, including hoses, and can more quickly heats ATF.

In order to achieve the objects, a reservoir of ATF includes: a housing that is combined with (on) a transmission that contains ATF and into/out of which the AFT flows; and a heating body that combined with the housing and heats the ATF flowing in the housing by generating heat when power is applied.

In some exemplary embodiments of the present one or more baffles may be disposed in the housing to divide space inside the housing in order to increase the contact time between the ATF and the heating body by reducing the flow speed of the ATF.

Also, an intake nipple through which ATF flows inside the reservoir and an exit nipple through which ATF flows outside the reservoir are formed within the housing. The transmission may be connected with an oil cooler as well, which cools the ATF, through a first hose. The oil cooler may be connected with the intake nipple through a second hose, and the exit nipple may be connected with the transmission through a third hose. An on-off valve that stops or allows flow of ATF through the second hose or the third hose may also be mounted on the housing.

Furthermore, in some exemplary embodiments of the present invention, when the temperature of the ATF is a reference temperature or less, the on-off valve stops the flow of the ATF through the second hose or the third hose and allows power to be applied to a heating body, and when the temperature of the ATF is the reference temperature or more, the on-off valve allows the ATF to flow through the second hose and the third hose and cuts the power supplied to the heating body. More specifically, the heating body may be implemented by a PTC thermistor that generates heat when power is applied.

According to the present invention having the configuration described above, it is possible to more quickly heat ATF by applying power and keep the generated heat in the housing. Therefore, to the present invention improves fuel efficiency, as viscosity of the ATF is maintained within a normal range earlier.

Further, since the baffles may be disposed in the housing, it is possible to increase the amount of time the ATF is exposed to the heating body in the housing, and the housing can be connected with the oil cooler by the intake nipple and the exit nipple, which is advantageous in mounting and arranging the hoses connecting the oil cooler with the transmission.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
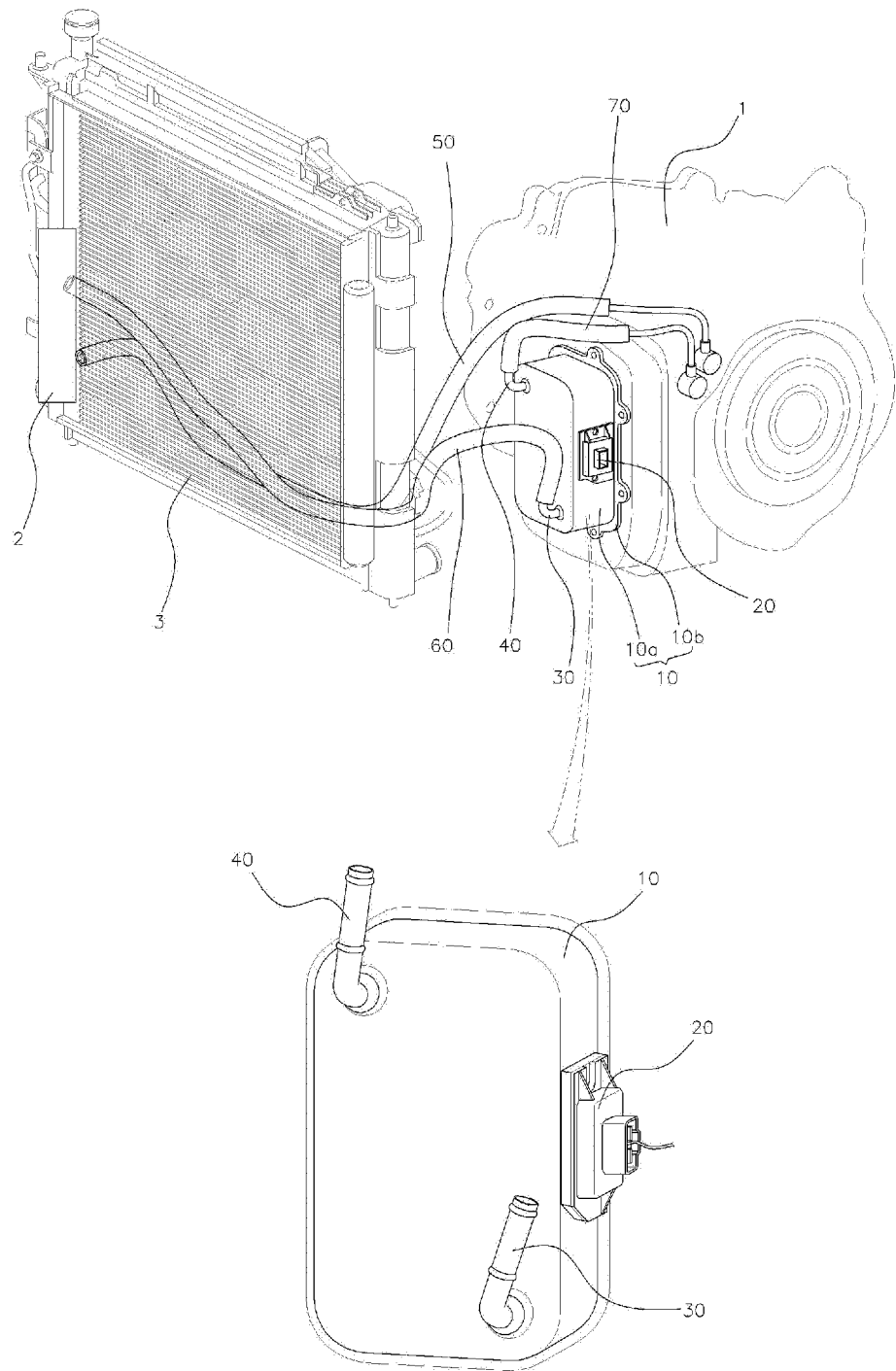
FIG. 1 is a view showing that a reservoir of ATF according to an exemplary embodiment of the present invention is combined with a transmission and connected with an oil cooler through hoses, and showing the reservoir of ATF enlarged.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Hereinafter, a reservoir of transmission fluid, e.g., automatic transmission fluid (ATF) according to an exemplary embodiment of the present invention is described in detail with reference to the accompanying drawings.

As shown in FIG. 1, a reservoir of an ATF of the present invention is mounted on one side of a transmission 1 and connected with an oil cooler 2 mounted on a radiator 3 through hoses 50, 60, and 70. That is, an intake nipple 30 through which ATF flows into a housing 10 and an exit nipple 40 through which ATF flows outside the housing 10 (into the transmission) are formed at the housing 10 of the reservoir. The transmission 1 is connected with the oil cooler 2 that is connected with the radiator through the first hose 50 and cools the ATF. The oil cooler 2 is connected with the intake nipple 30 through the second hose 60, and the exit nipple 40 is connected with the transmission 1 through the third hose 70.

Figure 2:
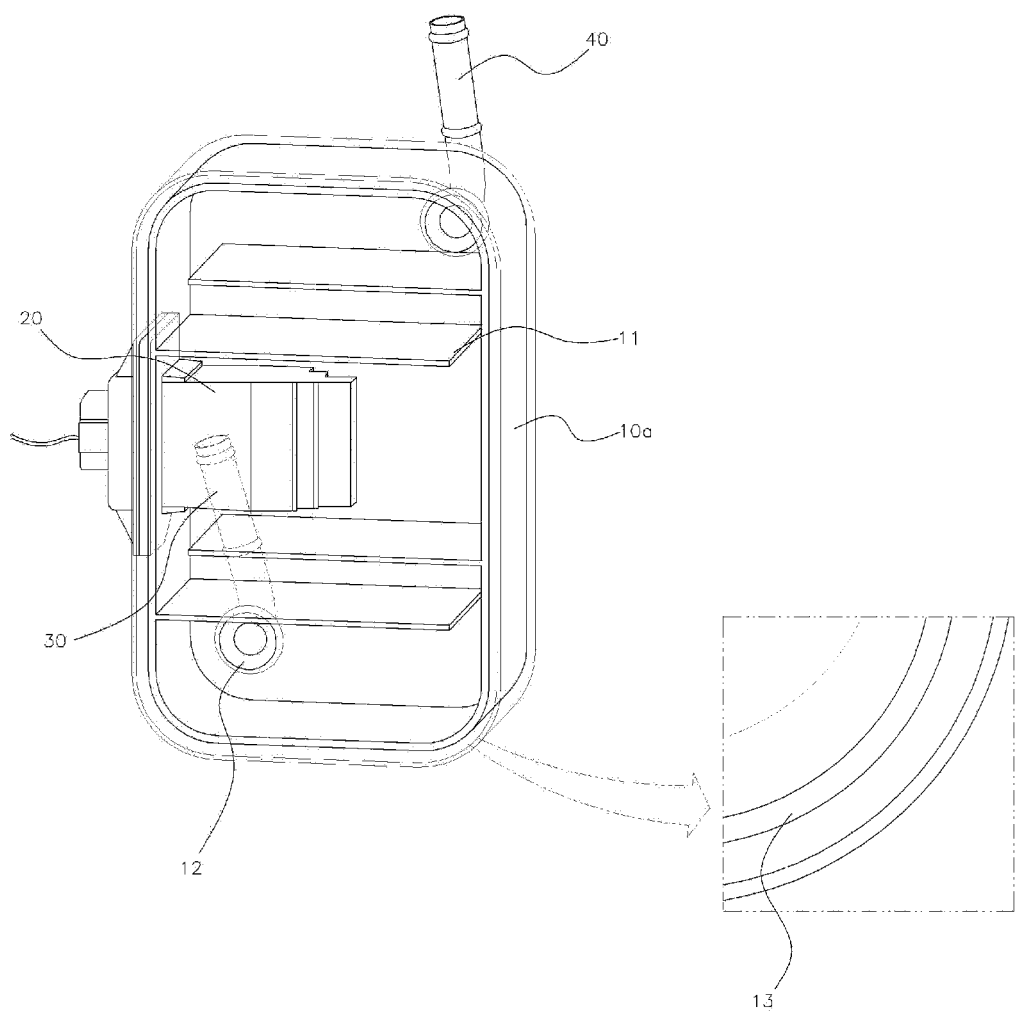
FIG. 2 is a view showing a housing with a cover removed and a partially enlarged portion according to an exemplary embodiment of the present invention.
Figure 3:
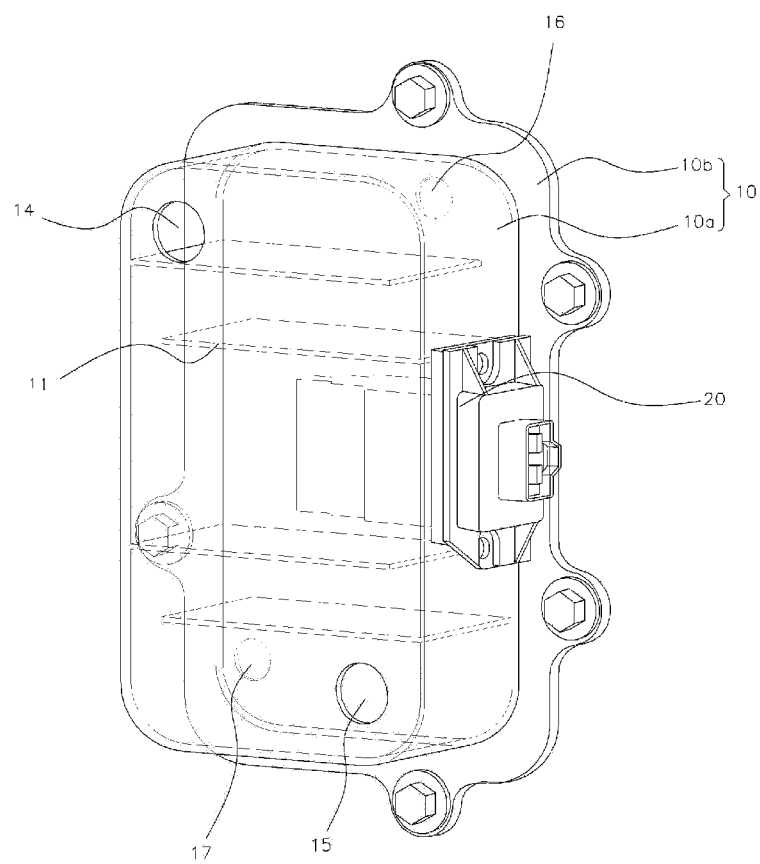
FIG. 3 is a view showing the inside of the reservoir of ATF according to an exemplary embodiment of the present invention.

The housing 10 may be implemented by combining a box-shaped case 10a with one side open with a cover 10b provided to cover the open side of the case 10a. Referring to FIGS. 2 and 3, mounting apertures 14 and 15 are formed through the case 10a such that the intake nipple 30 and the exit nipple 40 can be combined, while intake and exit holes 16 and 17 through which ATF in the transmission 1 flows into and out of the housing 10 are formed through the cover 10b.

Two or more baffles 11 may be mounted in the housing 10 to divide the space inside of the housing such that a zigzag path of the ATF is formed, and a heating body 20 that heats the ATF flowing in the housing by heating when power is applied is mounted on the housing 10.

The heating body 20 according to an exemplary embodiment of the present invention may include a PTC (Positive Temperature Coefficient) thermistor that generates heat with an increase in resistance when a current is applied thereto. More specifically, a heating fin may be connected with the PTC thermistor and increase the heating area, a connector electrically may be connected with the PTC thermistor, and a bracket may be applied to fix the PCT thermistor, the heating fin, and the connector to the housing 10.

An on-off valve 12 may be installed in the housing 10 to stop or allow the flow of the ATF through the second hose 60 (or the third hose) (that is controlled to be opened/closed by power) (see FIG. 2).

A temperature sensor 80 that senses the temperature of the ATF may be mounted on the housing 10 or the transmission 1 and communicate with an engine control unit (ECU). The ECU may control the power applied to the heating body 20 and the opening/closing of the on-off valve 12 in accordance with a predetermined logic.

The operation and control of the reservoir of ATF of the present invention which has the configuration described above are described in more detail below. More specifically, when the temperature of the ATF (which is measured by the temperature sensor) is a reference temperature or less, the on-off valve 12 stops the flow of the ATF through the second hose 60 or the third hose 70 (to stop circulation of the ATF through the oil cooler) and power is supplied to the heating body 20 to quickly heat the ATF which is stored in the transmission. The ATF as a result flows into and out of the housing 10 through the intake and exit holes 16 and 17.

On the other hand, when the temperature of the ATF is the reference temperature or more, the on-off valve 12 allows the ATF to flow through the second hose 60 and the third hose 70 and the power supplied to heating body 20 is terminated, so that the housing 10 functions only as a flow path for the ATF.

Figure 4:
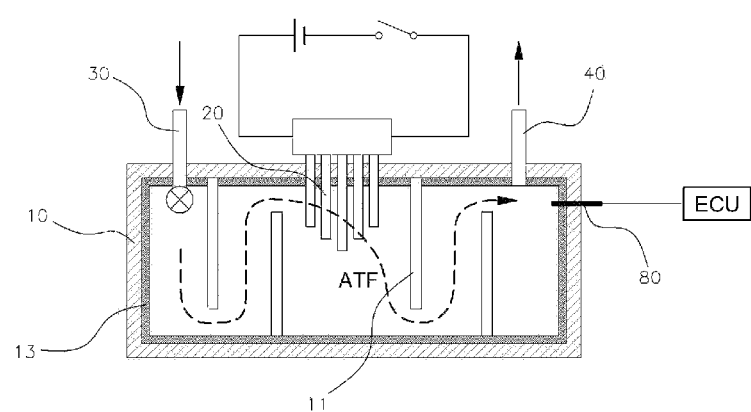
FIG. 4 is a view simplifying the cross-section of the reservoir of ATF according to an exemplary embodiment of the present invention.

According to an exemplary embodiment of the present invention, as shown in FIGS. 2 and 4, a thermal insulation material 13 may be attached on the inner side of the housing 10 (or on both inner and outer sides), so that it is possible to reduce the cooling of the ATF to maintain the heat of the ATF. The thermal insulation material 13 may be, for example, an aerogel-impregnated fabric.

The specification and the embodiments shown in the drawings provide specific examples for helping understanding of the present invention, without limiting the scope of the present invention. It is apparent to those skilled in the art that the present invention may be modified in various ways on the basis of the spirit of the present invention other than the embodiments described herein.

What is claimed is:

1. A reservoir of ATF comprising:
   a housing that is combined with a transmission containing automatic transmission fluid (ATF) and into/out of which the AFT flows;
   a heating body that combined with the housing and heats the ATF flowing in the housing by generating heat when power is applied to the heating body; and
   a valve controlling the flow of fluid into and out of the reservoir,
   wherein the engine control unit controls the valve and the heating body to maintain the fluid at a consistent temperature.

2. The reservoir of claim 1, wherein one or more baffles are disposed in the housing to divide space inside the housing.

3. The reservoir of claim 1, wherein an intake nipple through which ATF flows inside and an exit nipple through which ATF flows outside are formed at an inlet and an outlet of the housing respectively, the transmission is connected with an oil cooler, which cools the ATF, through a first hose, the oil cooler connected with the intake nipple through a second hose, the exit nipple connected with the transmission through a third hose, and an on-off valve that stops or allows flow of ATF through the second hose or the third hose is mounted on the housing.

4. The reservoir of claim 3, wherein when the temperature of the ATF is a reference temperature or less, the on-off valve stops the flow of the ATF through the second hose or the third hose and allows power to be applied to a heating body, and when the temperature of the ATF is the reference temperature or more, the on-off valve allows the ATF to flow through the second hose and the third hose and cuts the power supplied to the heating body.

5. The reservoir of claim 4, wherein the heating body includes a PTC thermistor that generates heat when power is applied.

6. The reservoir of the claim 1, wherein a thermal insulation material is attached to at least one side of the housing.

7. The reservoir of the claim 6, wherein the thermal insulation material is an aerogel-impregnated fabric.

8. The reservoir of the claim 1, wherein a temperature sensor is mounted within the reservoir and is configured to communicate with an engine control unit.

* * * * *